(12) United States Patent
Yu et al.

(10) Patent No.: US 9,057,609 B2
(45) Date of Patent: Jun. 16, 2015

(54) GROUND-BASED CAMERA SURVEYING AND GUIDING METHOD FOR AIRCRAFT LANDING AND UNMANNED AERIAL VEHICLE RECOVERY

(75) Inventors: Qifeng Yu, HuNan (CN); Zhihui Lei, HuNan (CN); Xiaohu Zhang, HuNan (CN); Yang Shang, HuNan (CN); Heng Zhang, HuNan (CN); Xiang Zhou, HuNan (CN)

(73) Assignee: National University of Defense Technology, Changsha, Hunan (CN)

( * ) Notice: Subject to any disclaimer, the term of this patent is extended or adjusted under 35 U.S.C. 154(b) by 932 days.

(21) Appl. No.: 13/260,471

(22) PCT Filed: Mar. 27, 2009

(86) PCT No.: PCT/CN2009/000327
§ 371 (c)(1),
(2), (4) Date: Dec. 19, 2011

(87) PCT Pub. No.: WO2010/108301
PCT Pub. Date: Sep. 30, 2010

(65) Prior Publication Data
US 2012/0075461 A1    Mar. 29, 2012

(51) Int. Cl.
*G01C 11/00* (2006.01)
*G01C 21/10* (2006.01)
*G05D 1/06* (2006.01)
(Continued)

(52) U.S. Cl.
CPC ............... *G01C 11/00* (2013.01); *G01C 21/10* (2013.01); *G05D 1/0676* (2013.01); *G08G 5/025* (2013.01); *G08G 5/0026* (2013.01); *G01S 5/16* (2013.01); *B64C 2201/187* (2013.01)

(58) Field of Classification Search
None
See application file for complete search history.

(56) References Cited

U.S. PATENT DOCUMENTS

| 4,554,543 A | 11/1985 | Wyatt et al. |
| 6,356,228 B1 * | 3/2002 | Tomita ............................. 342/33 |

(Continued)

FOREIGN PATENT DOCUMENTS

| CN | 1276062 A | 12/2000 |
| CN | 1670478 A | 9/2005 |

(Continued)

OTHER PUBLICATIONS

Altuğ, Erdiç, et al., "*Control of a Quadrotor Helicopter Using Visual Feedback*", Proceedings of the 2002 IEEE International Conference on Robotics & Automation, Washington, D.C. May 2002, pp. 72-77.
Tanaka, Toshikazu, et al., "*Autonomous Flight Control for a Small RC Helicopter a Measurement System with an EKF and a Fuzzy Control via GA-Based Learning*", SICE-ICASE International Joint Conference, Oct. 18-21, 2006 in Bexco, Busan, Korea, pp. 1279-1284.

*Primary Examiner* — Sath V Perungavoor
*Assistant Examiner* — Dakshesh Parikh
(74) *Attorney, Agent, or Firm* — Brinks Gilson & Lione

(57) ABSTRACT

A ground-based videometrics guiding method for aircraft landing or unmanned aerial vehicles recovery is provided. The method comprised the following steps: setting videos(1, 2,3,4,5,6) near the landing area of the aircraft or unmanned aerial vehicles; real-time imaging the aircraft or unmanned aerial vehicles during their final approaches; and real-time measuring the trajectory, velocity, acceleration, post and other motion parameters of the aircraft or unmanned aerial vehicles by analyzing the video images and using videometrics technology, so as to provide guiding information for the aircraft landing or unmanned aerial vehicles recovery.

3 Claims, 6 Drawing Sheets

(51) Int. Cl.
  *G08G 5/02*  (2006.01)
  *G08G 5/00*  (2006.01)
  *G01S 5/16*  (2006.01)

(56) References Cited

U.S. PATENT DOCUMENTS

2003/0067542 A1* 4/2003 Monroe ................ 348/148
2008/0071431 A1  3/2008 Dockter et al.
2008/0177427 A1* 7/2008 Marty et al. ............ 701/3
2008/0319592 A1  12/2008 Colclough
2011/0063445 A1* 3/2011 Chew ................... 348/159

FOREIGN PATENT DOCUMENTS

| CN | 101000243 A | 7/2007 |
| CN | 101109640 A | 1/2008 |
| DE | 10305993 A1 | 8/2004 |
| GB | 2 224 613 A | 9/1990 |
| JP | 7329894 A | 12/1995 |

* cited by examiner (a)

(b)

(c)

GROUND-BASED CAMERA SURVEYING AND GUIDING METHOD FOR AIRCRAFT LANDING AND UNMANNED AERIAL VEHICLE RECOVERY

CROSS-REFERENCE TO RELATED APPLICATIONS

This application is a U.S. National Phase of the International Application No. PCT/CN2009/000327 filed on 27 Mar. 2009 designating the U.S. and published on 30 Sep. 2010 as WO 2010/108301.

FIELD OF INVENTION

The present invention relates to guiding and camera surveying techniques for aircraft landing and unmanned aerial vehicle (UAV) recovery, and the present invention further relates to providing guidance for aircraft landing and unmanned aerial vehicle recovery by surveying three-dimensional movement parameters of an aircraft or an unmanned aerial vehicle in the aircraft landing phase and during the unmanned aerial vehicle recovery in real time.

DESCRIPTION OF RELATED ART

Accidents take place most frequently in the aircraft landing phase and during the unmanned aerial vehicle (pilotless aircraft) recovery. Generally, a landing action is completed directly through the visual judgment result of a pilot. However, under low visibility weather conditions, the pilot cannot see the runway clearly and thus cannot land according to regular programs. Moreover, the visual judgment is greatly influenced by the psychological and physiological factors of the pilot, which also has certain influence on the security of the aircraft landing. The unmanned aerial vehicle recovery further depends on surveying the landing movement parameters of the unmanned aerial vehicle in real time and performing flying control of the unmanned aerial vehicle on the basis thereof.

The existing guiding techniques for aircraft landing mainly include: an inertial navigation system (INS), GPS (global positioning system) navigation positioning, an INS/GPS integrated navigation positioning system and a vision navigation system. The INS is the earliest-researched and most mature navigation technique; and GPS is a most popular and relatively mature navigation technique emerged in recent ten years. With the emergence of a plurality of navigation techniques, people naturally consider integrating different navigation techniques to take advantage of each navigation technique, so as to achieve better navigation effects, and thus, the INS/GPS integrated navigation is a relatively desirable navigation technique which is researched frequently. However, each navigation technique mentioned above has disadvantages: in the INS, inertance elements such as an accelerometer are used for detecting the acceleration of a carrier during movement, and then navigation parameters such as the position and velocity of the carrier are obtained through integrated computations, wherein the INS is most disadvantageous in that errors are accumulated over time; in the GPS navigation, a navigation satellite is used for navigation positioning, wherein it is advantageous in that the GPS navigation has high accuracy and is simple to operate, but this navigation manner is vulnerable to interference, so that the GPS navigation is only a semi-autonomous navigation positioning technique. In recent years, the vision-based navigation system has become one of the research focuses in navigation systems due to its specific advantages, and certain progress has been made. A strategy of a conventional vision navigation system is: first matching the ground object scene obtained from an aircraft in real time with the pre-obtained reference scene; and then based on a successful matching, computing a coordinate of the window center of the reference scene corresponding to the window center of the real-time scene, and using the coordinate as the space plane coordinate value of the aircraft, so as to realize space positioning of the aircraft. The system has advantages such as non-contact, high accuracy and invulnerability to interference. However, this kind of system also has some disadvantages, for example, if imaging is performed when the aircraft is at a height of 2,000 m, slight changes of an attitude angle and effect of orographic fluctuation both can cause large offset of the imaging point; and the computing method is complicated and can not be ensured to be performed in real time.

SUMMARY

The technical issue to be solved in the present invention is that aiming at defects of the prior art, a ground-based camera surveying and guiding method for aircraft landing and unmanned aerial vehicle recovery is provided, which is a ground-based camera surveying and guiding system mainly including one or more video cameras arranged near the landing areas of an aircraft or unmanned aerial vehicle. During the approaching process of the aircraft or the unmanned aerial vehicle, the system performs imaging of the aircraft in real time and detects movement parameters such as the track, velocity, acceleration, attitude of the aircraft or the unmanned aerial vehicle in real time by analyzing images and applying camera surveying method and technology, so as to provide reliable guidance for aircraft landing or unmanned aerial vehicle recovery.

The technical scheme of the present invention is that the ground-based camera surveying and guiding method for aircraft landing and unmanned aerial vehicle recovery includes:

(1) arranging a video camera near the landing areas of an aircraft or an unmanned aerial vehicle, the field of view of the video camera covering the flying survey area where the aircraft approaches;

(2) after field installation and adjustment of the video camera is completed, calibrating the parameters of the video camera;

(3) when surveying is initiated, starting to acquire images of the survey area and detect a target in real time;

(4) when the aircraft or the unmanned aerial vehicle is detected to have entered the survey area, starting to identify and extract the moving target features (such as the nose, wingtip, aircraft landing gear and landing light of the aircraft, or specially installed cooperation marks) in real time and compute a three-dimensional position, the attitude or the offset relative to the glide slope of the aircraft in real time, and providing guidance for aircraft landing or unmanned aerial vehicle recovery by computing the track, velocity, acceleration and flying direction of the aircraft through data filtering.

The present invention is further described as follows.

In step (2) of the present invention, after the field installation and adjustment of the device is completed, a calibration device is used for calibrating video camera parameters. The video camera calibration belongs to conventional techniques and there are multiple known calibration methods, wherein relevant contents of video surveying, photogrammetric surveying and computer vision in the prior art can be referred to for details.

In step (4) of the present invention, the detection of the moving target, the identification and extraction of features and the computation of target movement parameters belong to conventional techniques, and there are a plurality of known methods, wherein relevant contents of image analysis, video surveying, photogrammetric surveying, computer vision and data filtering in the prior art can be referred to for details.

Furthermore, during the survey process of identifying and extracting the target features in real time, a laser distance measuring instrument installed at the site of the video camera is used at the same time for measuring a relative distance from the aircraft in real time, so as to modify survey results of the target features and improve the accuracy of guiding and surveying.

The target feature data identified and extracted in real time are transferred to a computer used for image extraction, control and parameter computation, so as to perform the computation and provide the guidance.

In the present invention, the video camera is arranged near the landing areas of the aircraft or the unmanned aerial vehicle through one of the following methods:

a. fixing and installing fixed-focus video cameras at both sides of the landing runway, the intersected field of view of the video cameras at both sides of the runway covering the flying area where the aircraft approaches according to the guiding requests; and arranging multiple sets of fixed and installed fixed-focus video cameras for narrow and long survey areas, wherein each set of the fixed-focus video cameras includes at least two fixed-focus video cameras, and the video cameras at both sides of the runway are respectively intersected to cover the survey areas from far and near;

b. respectively installing a tripod head for monitoring at both sides of the landing runway, each tripod head having a zooming video camera installed thereon; and according to the guiding requests, during approaching process of the aircraft, scanning and covering the flying survey area through the intersected field of view of the two video cameras as the aircraft moves by controlling the rotation of the tripod head and the zooming of the video camera;

c. respectively fixing and installing fixed-focus video cameras at more than two sites on one side of the landing runway, the intersected field of view of the video cameras at multiple sites covering the flying survey area where the aircraft approaches according to the guiding requests; and arranging multiple sets of fixed and installed fixed-focus video cameras for narrow and long survey areas, wherein the video cameras at multiple sites are respectively intersected to cover the survey areas from far and near;

d. respectively installing a tripod head for monitoring at two sites on one side of the landing runway, each tripod head having a zooming video camera installed thereon; and according to the guiding requests, during the approaching process of the aircraft, scanning and covering the flying survey area through the intersected field of view of the two video cameras as the aircraft moves by controlling the rotation of the tripod head and the zooming of the video camera;

e. installing a video camera at the median line of the runway, wherein the video camera directs to the area where the aircraft approaches, and the optical axis of the video camera overlaps the median line of the glide slope.

In the present invention, when multiple sets of fixed and installed fixed-focus video cameras are respectively used for surveying different survey areas from far and near, the survey areas are divided into multiple areas for arranging surveying video camera sets respectively; first a distant-field video camera acquires images and detects a target in real time, identifies and extracts target features after the target is found, and then computes movement parameters of the target; when it is computed that the target has entered the intersected survey area of a middle-field video camera, a switch command is sent, so that the middle-field video camera is switched to acquire images and detect the target in real time, identify and extract target features, and compute movement parameters of the target; and the rest can be deduced by analogy, and the guiding survey is completed when the target moves away from the area on demand of guiding survey.

In the present invention, when the zooming video camera is used or the tripod head controls the direction of the video camera, first the video camera directs to the starting position of the survey area, acquires images and detects the target in real time, identifies and extracts target features after the target is found, and computes the movement parameters of the target; according to the target position and the result of velocity computation, the rotation angle and velocity of the tripod head are controlled, and the focal length of the video camera is adjusted, so as to ensure that a clear image of the target is formed in the field of view of the video camera; in the overall process, the target features are identified and extracted, the target movement parameters are computed and the rotation of the tripod head and the zooming of the video camera lens are controlled in real time; and the guiding survey is completed when the target moves away from the area on demand of guiding survey.

In the present invention, when a single video camera is used for surveying and the center area of the image corresponds to the glide slope, the target features are identified and extracted after the target is found. The direction and angle of the aircraft deviated from the median line of the glide slope is computed and whether the aircraft is on the glide slope is determined according to the direction and distance of the target on the image deviated from the image center.

It can be known from the above descriptions that the present invention provides a ground-based camera surveying and guiding method for aircraft landing and unmanned aerial vehicle recovery, which can achieve the following technical effects:

1) mature camera surveying method and technology with high accuracy and reliability are adopted;

2) the hardware devices are mature, simple and have low cost;

3) radar or other electronic devices are not required, and thus there is no electromagnetic interference;

4) assistance from GPS and the like is not required, and the method is an autonomic guiding survey without interferences from others;

5) the devices are moveable and versatile, and can be used in aircraft landing aid, unmanned aerial vehicle recovery and the like in many situations.

BRIEF DESCRIPTION OF DRAWINGS

FIG. 10 (*b*) is a schematic view of a condition in which the aircraft is on the glide slope but is at the lower left side deviated from the median line of the glide slope; and FIG. 10 (*c*) is a schematic view of a condition in which the aircraft is deviated from the glide slope at the lower left side.

DETAILED DESCRIPTION

A ground-based camera surveying and guiding method for aircraft landing and unmanned aerial vehicle recovery includes:

(1) arranging a video camera near the landing areas of an aircraft or an unmanned aerial vehicle, the field of view of the video camera covering the flying survey area where the aircraft approaches;

(2) after field installation and adjustment of the video camera is completed, calibrating video camera parameters;

(3) when surveying is initiated, starting to acquire images of the survey area and detect a target in real time;

(4) when the aircraft or the unmanned aerial vehicle is detected to have entered the survey area, starting to identify and extract the moving target features (such as the nose, wingtip, aircraft landing gear and landing light of the aircraft, or specially installed cooperation marks) in real time and compute a three-dimensional position, the attitude or the offset relative to the glide slope of the aircraft in real time, and providing guidance for aircraft landing or unmanned aerial vehicle recovery by computing the track, velocity, acceleration and flying direction of the aircraft through data filtering.

The video cameras can be arranged near the landing areas of the aircraft or the unmanned aerial vehicle in the following ways:

(1) a layout in which multiple sets of fixed-focus video cameras are fixed at both sides of a runway: respectively fixing and installing fixed-focus video cameras at two sides of the landing runway, the intersected field of view of the video cameras at both sides of the runway covering the flying area where the aircraft approaches according to the guiding requests. If the survey area is narrow and long, then multiple sets of fixed-focus video cameras are arranged; and the video cameras at both sides of the runway are respectively intersected to cover the survey area from far and near. A layout in which multiple sets of fixed-focus video cameras are fixed at both sides of the runway is shown in FIG. 1, wherein the survey area is divided into a distant field, a middle field and a near field, and three pairs of fixed and installed fixed-focus video cameras are respectively intersected to cover the distant field, the middle field and the near field.

Figure 1:
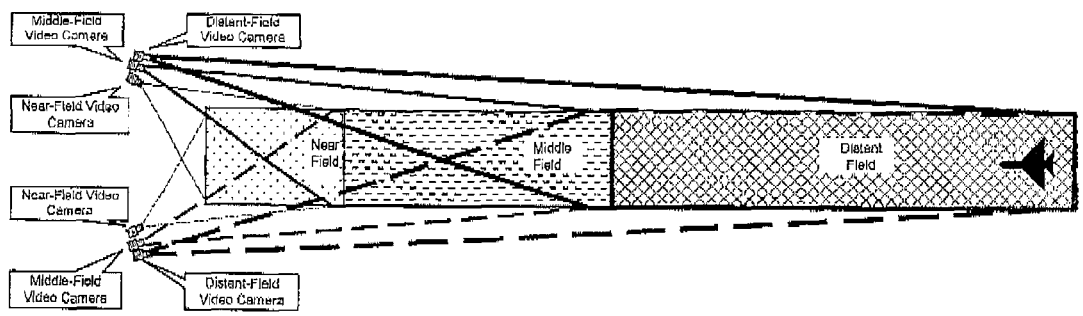
FIG. 1 is a schematic layout view of an embodiment in which multiple sets of fixed-focus video cameras are fixed on both sides of the runway.

Referring to FIG. 1, three fixed-focus video cameras are fixed and arranged respectively at both sides of the landing runway and the fixed-focus video cameras are respectively a distant-field video camera, a middle-field video camera and a near-field video camera. The field of view areas of a pair of distant-field video cameras are respectively the area surrounded with the thickest solid lines and the area surrounded with the thickest dash lines, and the distant-field survey area covered by the intersected field of view is the crossed-grid area in the figure; the field of view areas of a pair of middle-field video cameras are respectively the area surrounded with the medium-thick solid lines and the area surrounded with the medium-thick dash lines, and the middle-field survey area covered by the intersected field of view is the area with dash line segments in the figure; and the field of view areas of a pair of near-field video cameras are respectively the area surrounded with the thinnest solid lines and the area surrounded with the thinnest dash lines, and the near-field survey area covered by the intersected field of view is the area with hard spots in FIG. 1.

Figure 2:
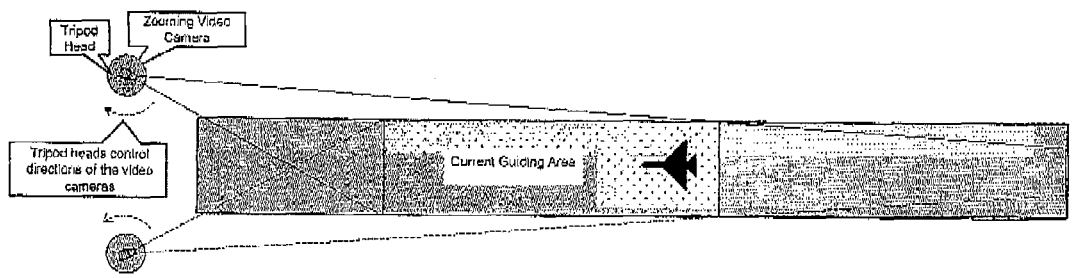
FIG. 2 is a schematic layout view of an embodiment in which zooming video cameras are arranged on both sides of the runway and tripod heads control the directions of the zooming video cameras.

(2) a layout in which zooming video cameras are arranged at both sides of the runway and tripod heads control the directions of the video cameras: respectively installing a tripod head at both sides of the landing runway, each tripod head having a zooming video camera installed thereon. As shown in FIG. 2, according to the guiding requests, during the approaching process of the aircraft, the intersected field of view of the two video cameras scans and covers the flying area as the aircraft moves by controlling the rotation of the tripod head and the zooming of the video camera. In FIG. 2, the field of view areas of two video cameras are respectively the area surrounded with solid lines and the area surrounded with dash lines. The area with hard spots in the figure covered by the intersected field of view of the two video cameras is the current guiding area. The dotted arrow in the figure represents the controlled rotation direction of the tripod head during the approaching process of the aircraft.

Figure 3:
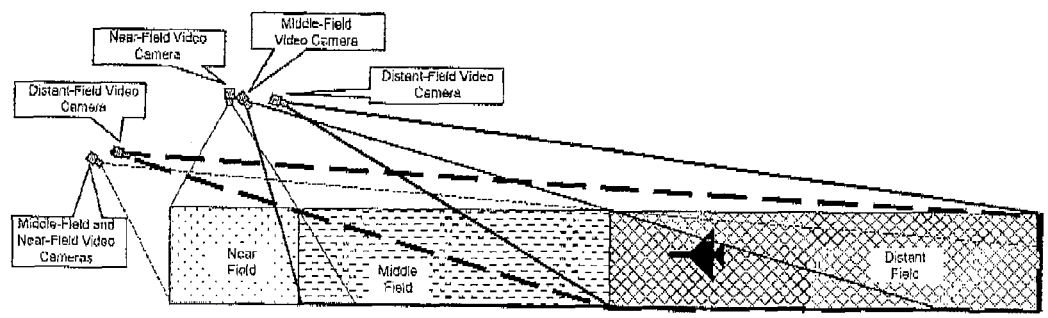
FIG. 3 is a schematic layout view of an embodiment in which multiple sets of fixed-focus video cameras are fixed on one side of the runway.

(3) a layout in which multiple sets of fixed-focus video cameras are fixed on one side of the runway: respectively fixing and installing fixed-focus video cameras at more than two sites on one side of the landing runway, the intersected field of view of multiple video cameras covering the flying area where the aircraft approaches according to the guiding requests. If the survey area is narrow and long, then multiple sets of fixed-focus video cameras are arranged, wherein the video cameras at the multiple sites are respectively intersected to cover the survey area from far and near. A layout in which multiple sets of fixed-focus video cameras are fixed on one side of the runway is shown in FIG. 3, wherein the survey area is divided into a distant field, a middle field and a near field, and two fixed-focus video cameras and three fixed-focus video cameras are respectively fixed and installed at two sites on one side of the runway. In FIG. 3, two fixed-focus video cameras and three fixed-focus video cameras are respectively fixed and installed at two sites on one side of the runway, so as to respectively intersect to cover the distant field, the middle field and the near field. The three video cameras at the front (near the approaching direction of the aircraft) site respectively take images of the distant field, the middle field and the near field; and one of the two video cameras at the behind site takes images of the distant field and the other takes images of the middle field and the near field.

Figure 4:
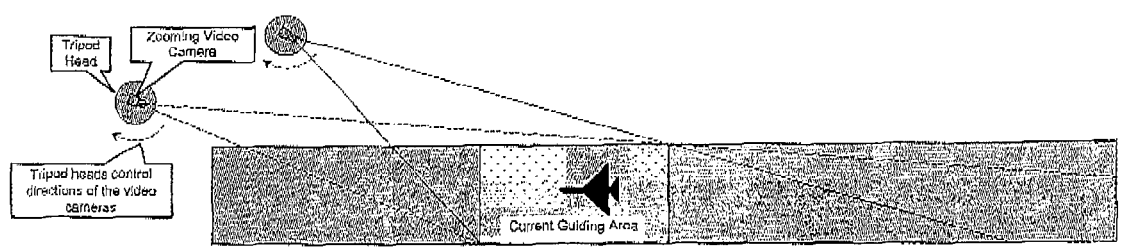
FIG. 4 is a schematic layout view of an embodiment in which zooming video cameras are arranged on one side of the runway and tripod heads control the directions of the zooming video cameras.
Figure 5:
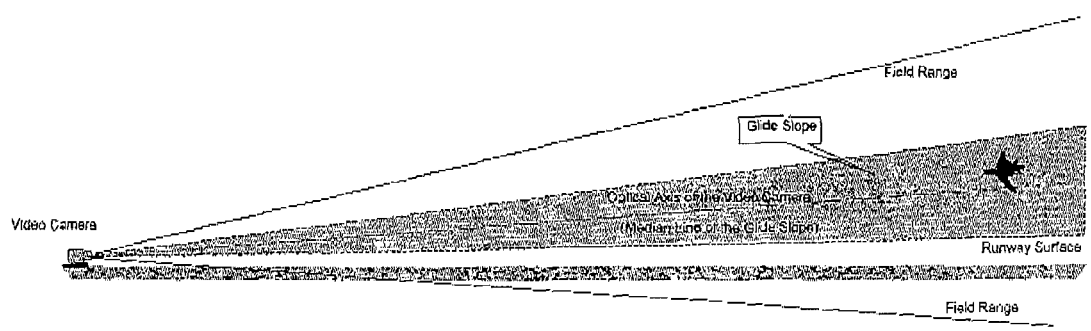
FIG. 5 is a schematic layout view of an embodiment in which a single video camera is used.

(4) a layout in which zooming video cameras are arranged on one side of the runway and tripod heads control the directions of the zooming video cameras: respectively installing a tripod head at two sites on one side of the landing runway, each tripod head having a zooming video camera installed thereon; and according to the guiding requests, during the approaching process of the aircraft, scanning and covering the flying area through the intersected field of view of the two video cameras as the aircraft moves by controlling the rotation of the tripod head and the zooming of the video camera, as shown in FIG. 4. In FIG. 4, the field of view areas of two video cameras are respectively the area surrounded with solid lines and the area surrounded with dash lines. The area with hard spots in the figure covered by the intersected field of view of the two video cameras is the current guiding area. The dotted arrow in the figure represents the controlled rotation direction of the tripod head during the approaching process of the aircraft.

(5) a layout in which only a single video camera is used: installing a video camera at the median line of the runway, wherein the video camera directs to the area where the aircraft approaches, and the optical axis of the video camera overlaps the median line of the glide slope.

Figure 10:
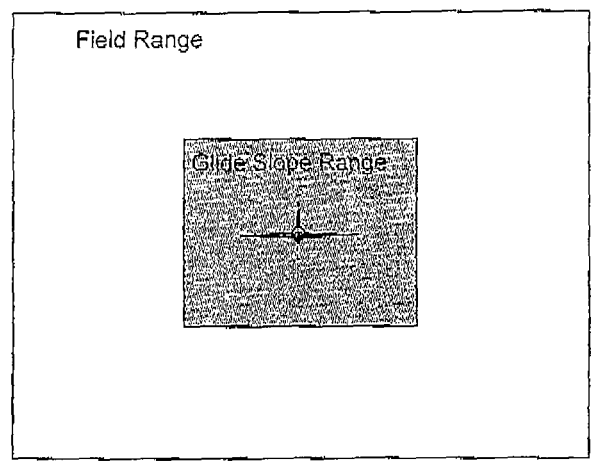
FIG. 10 is a schematic view of a condition in which a single video camera is used for taking images and analyzing the offset of an aircraft from the median line of a glide slope, wherein FIG. 10 (*a*) is a schematic view of a condition in which the aircraft is at the center of the glide slope.
Figure 10:
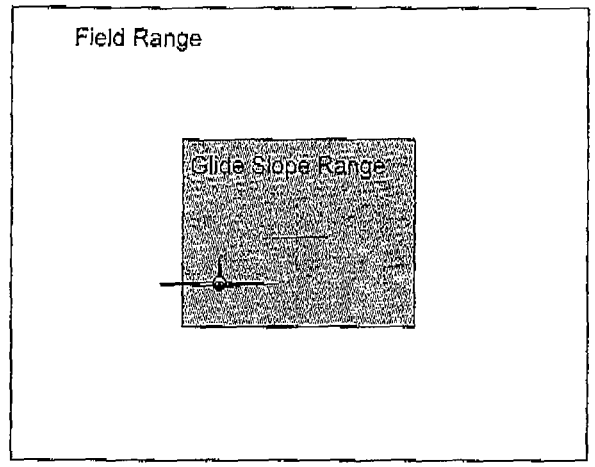
Figure 10:
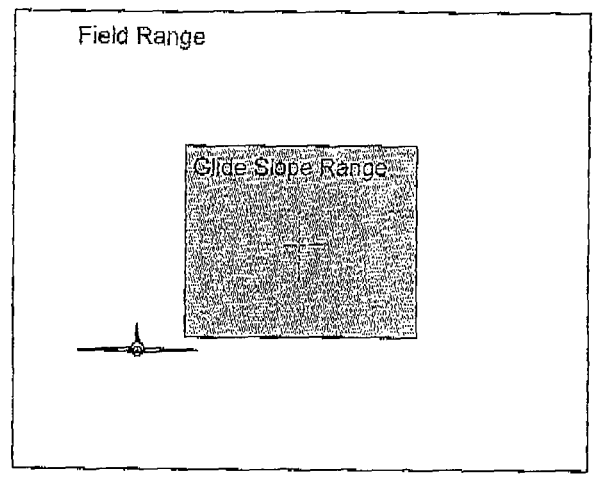

For the manner in which a single video camera is used, the center area of the image corresponds to the glide slope; the target features are identified and extracted after the target is found, and the direction and angle of the aircraft deviated from the median line of the glide slope are computed and whether the aircraft is on the glide slope is determined according to the direction and distance of the target on the image deviated from the image center; and the condition in which a single video camera is used for taking images and analyzing the offset of an aircraft from the median line of a glide slope is shown in FIG. 10.

In FIG. 10, the center area of the image corresponds to the glide slope, and the direction and angle of the aircraft deviated from the median line of the glide slope is computed and whether the aircraft is on the glide slope is determined according to the direction and distance of the target on the image deviated from the image center. In FIG. 10, FIG. 10 (a) illustrates that the aircraft is at the center of the glide slope; FIG. 10 (b) illustrates that the aircraft is on the glide slope but is at the lower left side deviated from the median line of the glide slope; and FIG. 10 (c) illustrates that the aircraft is deviated from the glide slope at the lower left side.

In the present invention, besides a video camera, a tripod head for monitoring and a laser distance measuring instrument, the adopted hardware devices also include a signal line for data transmission, a convertor (e.g. optical fibers, an optical transmitter and receiver), a computer for image acquisition, control and parameter computation, and a calibration device for calibrating video camera parameters such as a target rod. The relationships of the hardware devices of the layout in which the fixed-focus video camera is fixed and installed and the layout in which the zooming video camera are used and the tripod head controls the direction of the zooming video camera are respectively shown in FIGS. 6 and 7.

Figure 6:
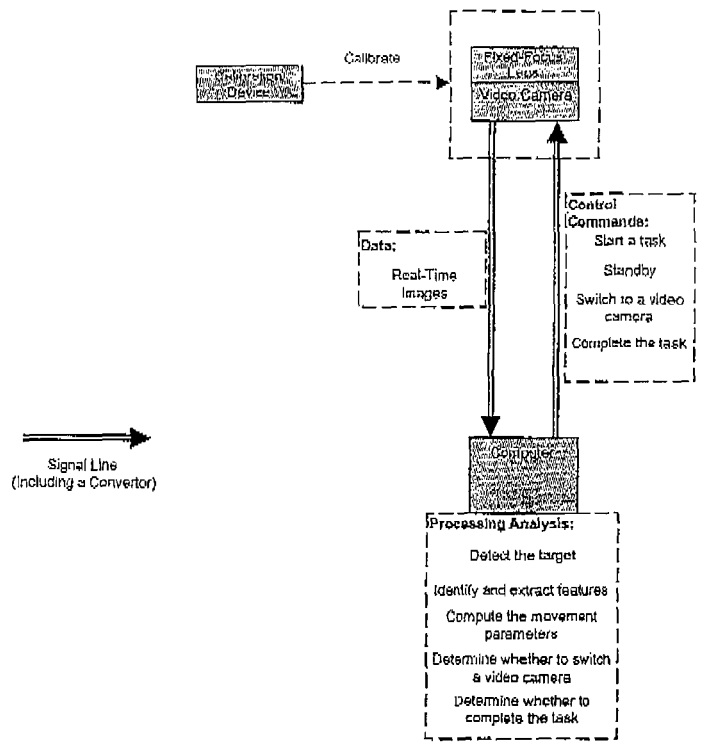
FIG. 6 is a relationship diagram of hardware devices in an embodiment in which a fixed-focus video camera is arranged in a fixing and installing manner.

The structural relationship of the hardware devices layout in which the fixed-focus video camera is fixed and installed can be shown in FIG. 6. A calibration device is used for calibrating video camera parameters such as a cardinal point, a focal length, an installation position and an attitude prior to the guiding task. The images acquired by the video camera in real time are transferred to a computer through the signal line. The computer performs processing analysis such as detecting the target, identifying and extracting the features, computing the movement parameters and determining whether to switch the video camera and whether to end the task. The computer sends commands such as starting the task, being on standby, switching a video camera and ending the task to the video camera through the signal line.

Figure 7:
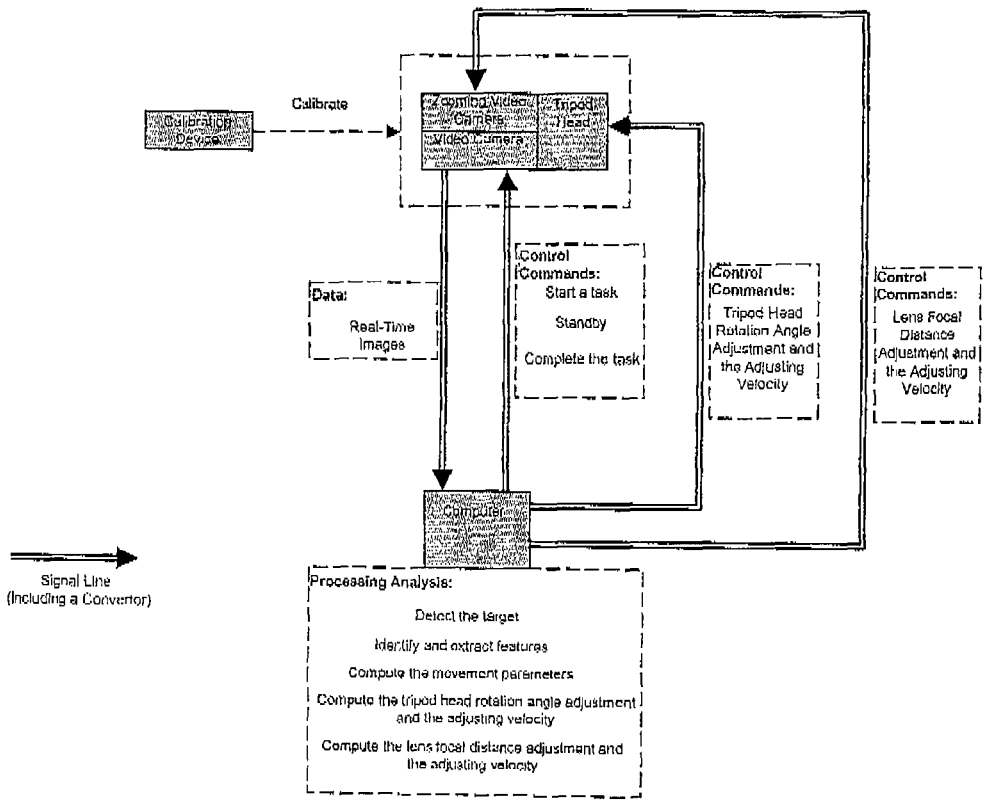
FIG. 7 is a relationship diagram of hardware devices in an embodiment in which a zooming video camera is used and a tripod head controls the direction of the zooming video camera.

The structural relationship of the hardware devices layout in which the zooming video camera is used and the tripod head controls directions of the zooming video camera can be shown in FIG. 7. A calibration device is used for calibrating the video camera parameters such as a cardinal point, a focal length, an installation position and an attitude prior to the guiding task. The images acquired by the video camera in real time are transferred to the computer through the signal line. The computer performs operations such as detecting the target, identifying and extracting the features, computing the movement parameters, computing the tripod head rotation angle adjustment and the adjusting velocity, and computing the lens focal distance adjustment and the adjusting velocity. The computer sends commands such as starting the task, being on standby and ending the task to the video camera through the signal line. The computer sends commands of the rotation angle adjustment and the adjusting velocity to the tripod head through the signal line. The computer sends commands of the focal distance adjustment and the adjusting velocity to the zooming lens through the signal line.

Figure 8:
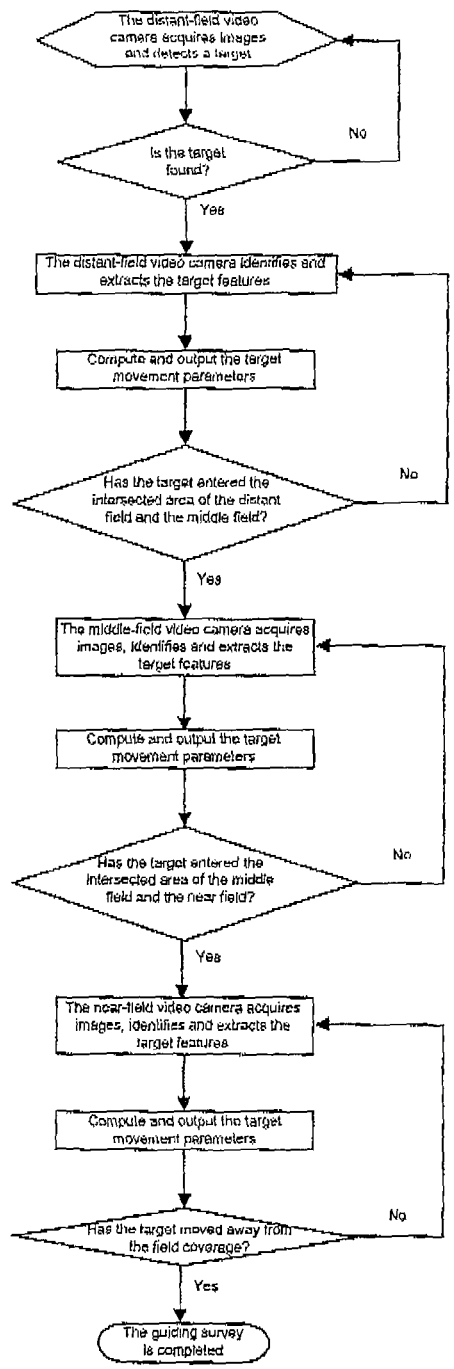
FIG. 8 is a flow chart of guiding survey in which fixation and installation of distant-field, middle-field and near-field fixed-focus video cameras is adopted.

In the present invention, for the layout in which multiple sets of fixed-focus video cameras are fixed and installed for respectively being responsible for different survey areas, the survey areas are divided into a distant field, a middle field and a near field, and a distant-field video camera, a middle-field video camera and a near-field video camera are correspondingly arranged; and the intersection survey of the distant-field, the middle-field and the near-field video cameras is preferable to have certain overlap areas, so as to improve the reliability. The procedure of performing guiding survey through the fixation and installation of the fixed-focus video cameras in the distant field, the middle field and the near field is shown in FIG. 8: first the distant-field video camera acquires images and detects a target in real time, identifies and extracts target features after the target is found, and then computes the movement parameters of the target; when it is computed that the target has entered the overlap area which is surveyed with intersection by the distant-field and middle-field video cameras, a switch command is sent, so that the middle-field video camera is switched to acquire images and detect the target in real time, identify and extract target features, and compute movement parameters of the target; when it is computed that the target has entered the overlap area which is surveyed with intersection by the middle-field and near-field video cameras, a switch command is sent, so that the near-field video camera is switched to acquire images and detect the target in real time, identify and extract target features, and compute the movement parameters of the target; and the guiding survey is completed when the target moves away from the survey area of the near-field video camera.

Figure 9:
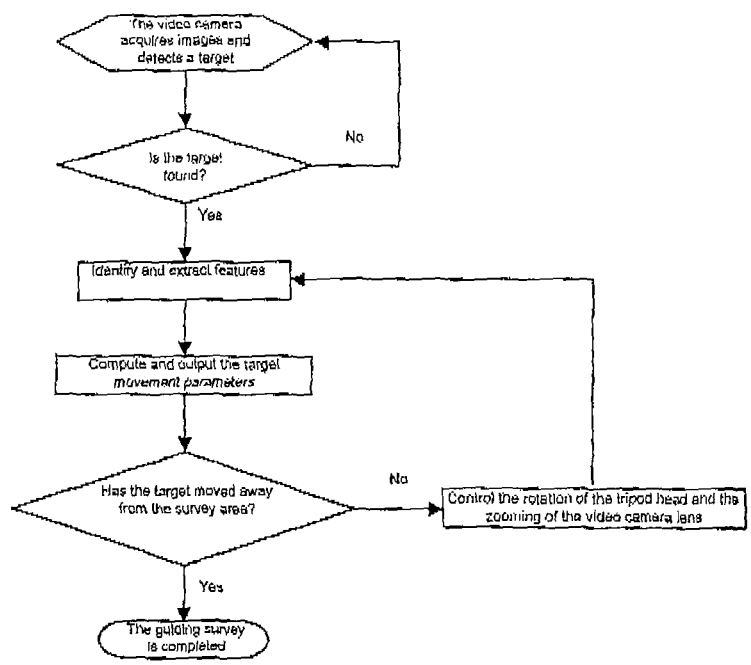
FIG. 9 is a flow chart of guiding survey in which a zooming video camera is used and a tripod head controls the direction of the zooming video camera.

In the present invention, for the zooming video camera, the guiding survey procedure in which the tripod head controls the direction of the zooming video camera is shown in FIG. 9: first the video camera directs to the starting position of the survey area, acquires images and detects a target in real time, identifies and extracts target features after the target is found, and computes the movement parameters of the target; according to the target position and the result of the velocity computation, the rotation angle and velocity of the tripod head are controlled, and the focal length of the video camera is adjusted, so as to ensure that a clear image of the target is formed in the field of view of the video camera; and in the overall process, the target features are identified and extracted, the parameters of the target movement are computed and the rotation of the tripod head and the zooming of the video camera lens are controlled in real time. The guiding survey is completed when the target moves away from the area on demand of survey.

What is claimed is:

1. A ground-based camera surveying and guiding method for aircraft landing and unmanned aerial vehicle recovery, comprising:
   (1) arranging video cameras near landing areas of an aircraft or an unmanned aerial vehicle, the fields of view of the video cameras covering a survey area where the aircraft or the unmanned aerial vehicle approaches;
   (2) calibrating the video cameras;
   (3) when surveying is initiated, starting to acquire images of the survey area and detect the aircraft or the unmanned aerial vehicle in real time; and
   (4) when the aircraft or the unmanned aerial vehicle is detected to have entered the survey area, starting to identify and extract features of the aircraft or the unmanned aerial vehicle and compute a three-dimensional position and an altitude of the aircraft or the unmanned aerial vehicle, and providing guidance for aircraft landing or unmanned aerial vehicle recovery by computing a track, velocity and acceleration of the aircraft or the unmanned aerial vehicle through data filtering,
   wherein the video camera are arranged near the landing areas of the aircraft or the unmanned aerial vehicle in one of the following manners:
   a. fixing and installing fixed-focus video cameras at both sides of the landing areas, an intersected field of view of the video cameras at both sides of the landing areas covering an area where the aircraft approaches according to the guiding requests, and, where the landing areas are narrow and long, fixing and installing multiple sets of fixed-focus video cameras, each set of the fixed-focus video cameras comprising at least two fixed-focus video cameras, and fields of view of the video cameras at both sides of the landing areas respectively overlapping to cover the survey area from a far end to a near end;
   b. installing tripod heads respectively at both sides of the landing areas, each tripod head having a zooming video camera installed thereon, and according to guiding requests, during an approaching process of the aircraft or the unmanned aerial vehicle, scanning and covering the survey area through an overlapping field of view of the two video cameras as the aircraft moves by controlling rotation of the tripod heads and zooming of the video cameras;
   c. respectively fixing and installing fixed-focus video cameras at more than two sites on one side of the landing areas, an overlapping field of view of the video cameras at multiple sites covering the survey area where the aircraft or the unmanned aerial vehicle approaches according to guiding requests, and, where the landing areas are narrow and long, fixing and installing multiple sets of fixed-focus video cameras, fields of view of the video cameras at the multiple sites respectively overlapping to cover the survey area from a far end to a near end; and
   d. installing tripod heads respectively at two sites on one side of the landing areas, each tripod head having a zooming video camera installed thereon, and according to guiding requests, during an approaching process of the aircraft or the unmanned aerial vehicle, scanning and covering the survey area through an overlapping field of view of the two video cameras as the aircraft moves by controlling rotation of the tripod heads and zooming of the video cameras.

2. The method of claim 1, wherein when multiple sets of fixed-focus video cameras are used for surveying the survey area, the survey area is divided into multiple areas for arranging surveying video camera sets respectively, wherein:
   distant-field video cameras acquire images and detects the aircraft or the unmanned aerial vehicle in real time, identify and extract target features of the aircraft or the unmanned aerial vehicle, and then compute movement parameters of the aircraft or the unmanned aerial vehicle;
   when it is computed that the aircraft or the unmanned aerial vehicle has entered an overlapping survey area of middle-field video cameras, the middle-field video cameras are controlled by a switch command to acquire images and detect the aircraft or the unmanned aerial vehicle in real time, identify and extract features of the aircraft or the unmanned aerial vehicle, and compute movement parameters of the aircraft or the unmanned aerial vehicle; and
   guiding survey proceeds in this manner and completes when the aircraft or the unmanned aerial vehicle moves away from the survey area.

3. The method of claim 1, wherein when the zooming video cameras are used and the tripod heads are used to control directions of the video cameras,
   first the video cameras are directed towards a starting position of the survey area, acquire images and detect the aircraft or the unmanned aerial vehicle in real time, identify and extract features of the aircraft or the unmanned aerial vehicle, and compute movement parameters of the the aircraft or the unmanned aerial vehicle;
   based on the position of the aircraft or the unmanned aerial vehicle and the result of velocity computation, the rotation angle and velocity of the tripod heads are controlled, and the focal length of the video cameras is adjusted, so as to ensure that a clear image of the aircraft or the unmanned aerial vehicle is formed in the fields of view of the video cameras;
   in the overall process, features of the aircraft or the unmanned aerial vehicle are identified and extracted, movement parameters of the aircraft or the unmanned aerial vehicle are computed and rotation of the tripod heads and zooming of the video camera lens are controlled in real time; and
   guiding survey completes when the aircraft or the unmanned aerial vehicle moves away from the survey area.

* * * * *